April 16, 1957  M. PINTO  2,788,568
SHEARING CUTTERS
Filed April 27, 1953  2 Sheets-Sheet 1
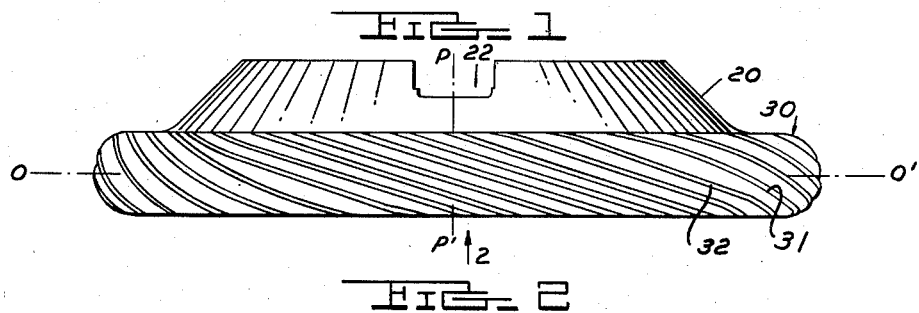
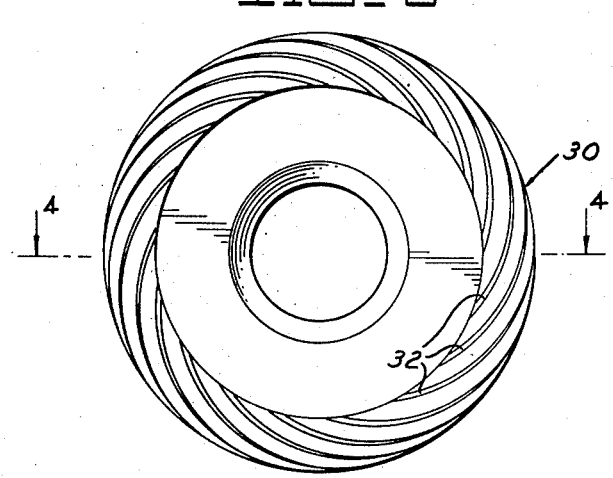
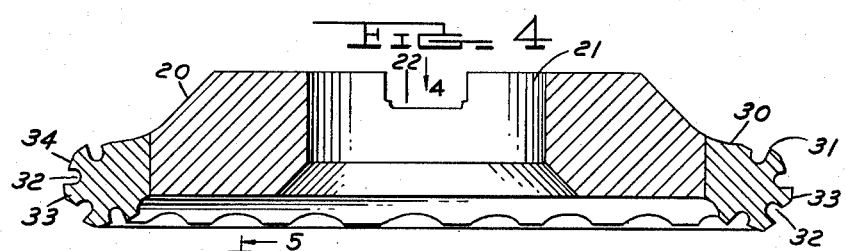
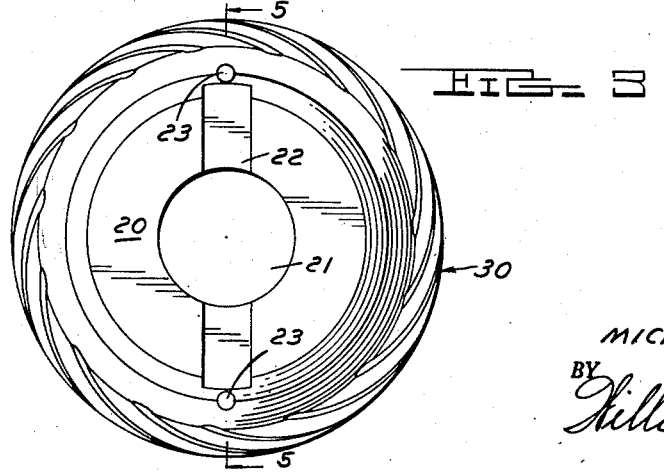
INVENTOR.
MICHAEL PINTO
BY
ATTORNEY

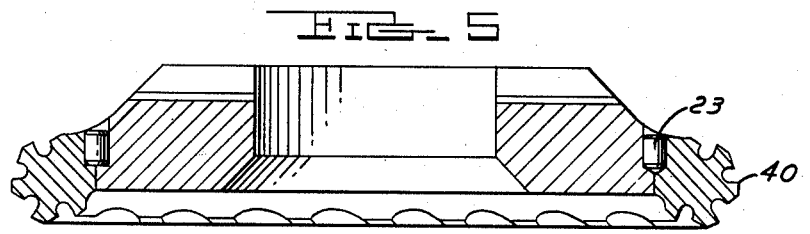
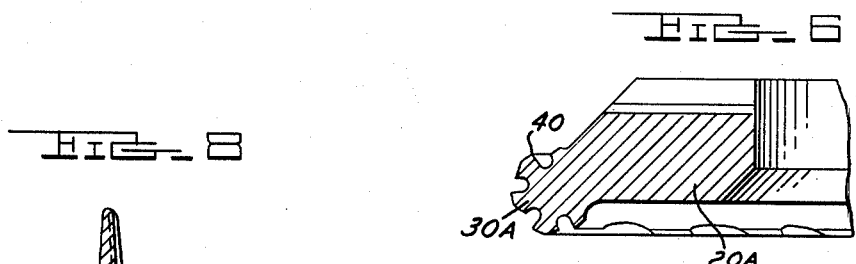
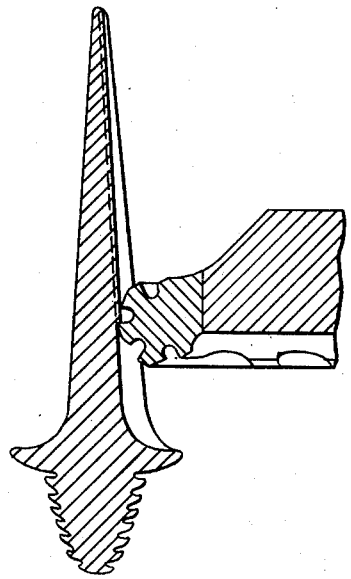
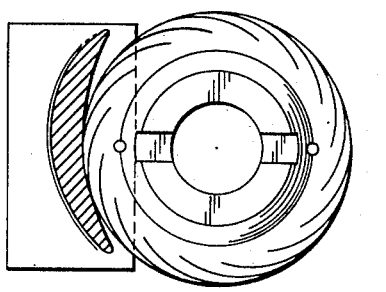
INVENTOR.
MICHAEL PINTO
ATTORNEY

United States Patent Office 2,788,568
Patented Apr. 16, 1957

2,788,568

SHEARING CUTTERS

Michael Pinto, Southfield Township, Oakland County, Mich., assignor to Douglas Tool Company, a corporation of Michigan Application April 27, 1953, Serial No. 351,200

3 Claims. (Cl. 29—103)

This invention relates to metal cutting or shaving tools and in particular to improvements in metal shear cutting tools which are capable of accurately removing material from metal workpieces to close tolerances with a sliding-cutting or skiving action without leaving conventional tool marks as known in the art but which leaves a substantially smooth surface thereby eliminating most of the usual subsequent grinding and polishing such as disclosed in my copending application Serial No. 156,806, filed April 19, 1950, now issued as Patent No. 2,649,648, issued August 25, 1953, of which this application constitutes a continuation in part.

The science of metallurgy is progressively producing harder and tougher metals adapted to use not only as tools but also for product structure. Fabrication of these products by conventional material removing tools is exceedingly difficult if not sometimes impossible. In those instances where conventional material removing tools may be used, the surfaces of the product or workpiece are exceedingly rough and require excessive grinding and polishing operations to produce the proper surface on the workpiece.

The shear cutter herein disclosed is a tool which removes material from a workpiece in a sliding-shearing manner which smoothly and accurately surfaces a workpiece with little or no subsequent grinding and with only a small amount of polishing being required in the event a polished surface is specified.

It is a primary object of this invention, therefore, to provide a metal cutting tool which cuts, skives, or shaves material from a workpiece with a sliding-shearing action thereby leaving the workpiece surface exceedingly smooth at desired close tolerances.

An object of the invention is to provide a tool for machining material whose hardness and toughness is increased by the machining thereof, the tool machining the material by a sliding-shearing action which travels an exceedingly large edge area of the tool relative to a very small area of the material with the cutting edges of the tool never working in an area which has become hardened through the machining of the material.

An object of the invention is to provide a rotary tool, the cutting edges of which are inclined at an acute angle to a plane disposed at right angles to the tool's axis of rotation.

An object of the invention is to provide a rotary tool having a peripheral cutting edge which is arcuate in cross-section thereby providing a ring area at the cutting surface of the tool.

An object of the invention is to provide a rotary tool having cutting edges on the radial edge and on the axial sides of the tool periphery on the same helical cutting angle relative to the workpiece and with cutting edges disposed thereon at the same angle regardless of edge or side location.

An object of the invention is to provide a tool as set forth in the above object which may have the helix continued from either or both axial sides radially inwardly of the arcuate peripheral edge cross-section on either or both axial sides of the workpiece.

An object of the invention is to provide a tool having cutting edges on and annular, or ring-like periphery with the cutting edges all facing in the direction of rotation.

A primary object of the present invention is to provide a metal cutting tool of an improved construction which provides a continuous shear or shave cut which is efficient and effective, and which produces a smooth cut surface without the usual tool gashes generally found normal to or in an angular position with respect to the tool travel or cutting edge of the tool on the work.

A further object of the invention is to provide an improved metal cutting tool having a continuous shear or shave cut action which, when applied to the cutting of either planar or compound curved surfaces, generates an uninterrupted cutting condition which removes material without tool gashes requiring very little subsequent polishing of the workpiece even in the event a polished surface on the part is specified.

A further object of the invention is to provide a cutting tool particularly efficient and effective in the smooth cutting of tough, ductile alloy steels which work hardens under conventional cutter application and in the cutting of fillets at the angular intersection of two surfaces where one of the surfaces is concave or convex such as found in turbine blades for jet engines.

These and other objects of the invention will become apparent by reference to the following description of a sliding-shearing cutter or tool embodying the invention taken in connection with the accompanying drawing, in which:

Fig. 1 is a side elevational view of a cutter;
Fig. 2 is a bottom plan view of the cutter of Fig. 1;
Fig. 3 is a top plan view of the cutter of Fig. 1;
Fig. 4 is a cross-sectional view taken on the line 4—4 of Fig. 2;
Fig. 5 is a view similar to Fig. 4 taken on the line 5—5 of Fig. 3;
Fig. 6 is a view similar to Fig. 4 and 5 showing a modification;
Fig. 7 is a view similar to Figs. 4, 5, and 6 showing a modification;
Fig. 8 is a vertical cross-section view of a cutter and workpiece in working relationship; and
Fig. 9 is a top-plan view of the device seen in Fig. 8, showing the workpiece in section.

Referring now to the drawings wherein like numerals refer to like and corresponding parts throughout the several views, the sliding-shearing, skive, or shear cutter tool disclosed therein to illustrate the invention comprises a disc, hub, or wheel central support body 20 and a peripheral rim or tire 30 which carries the skiving or shaving edges 31.

The central body 20 may be equipped with a center aperture 21 for receiving the end of a supporting stub-shaft, not shown, and a tang drive 22 for receiving a tang, not shown, or for otherwise interfitting with a driving member. The ring-like rim or tire 30 may be integral with the central body as seen in Fig. 6 where the body 20A and rim 30A are of one piece construction in contradistinction to the device of Fig. 7 where the body 20B and rim 30B are a two piece construction as are the devices of the remaining figures. The rim 30 and body 20, when separately rough formed and later interfitted, may be keyed together for rotational movement as by keys 23, Figs. 3 and 5. The two piece construction facilitates the use of different metals in the body and rim such as a relatively cheap ductile body and a high cutting quality rim such as tungsten carbide or tool steel.

Referring now to the annular peripheral rim or tire 30, 30A, and 30B it is to be noted that the same may be interrupted at any point for purposes of attachment to the central body 20, 20A, and 20B and that the cutting edges 40 may be formed over the remainder of the rim, Figs. 5 to 7, or over any less area of the rim as desired and co-pending application Serial No. 371,864, filed June 12, 1953, shows a machine for forming or grinding the skiving edges or shaving edges on the desired area of the ring-like periphery or rim and it is to be noted that the skiving or shaving edge area of the rim or tire is substantially semicircular or arcuate in cross-section over a range of 90° to 270° with the range of the particular cutter being selected in view of the purpose for which it is to be used. The term "semi" is used relative to the term "circular" in the sense of being approximate and therefore denoting a portion of a circular formation which ranges up to around 270.

More particularly the shearing or skiving cutter can embody the characteristics of a side mill, a bottom end mill and a top end mill as seen in the embodiment shown in Fig. 7; the characteristics of an end mill and a side mill as seen in the embodiment shown in the remaining figures; or the single characteristic of a side or end mill only, not shown, by limiting the cutting area of the device to the desired area.

Specifically the skiving, shearing cutting edges are preferably formed on a spiral or helical angle of from 2° to 30° or a radial rake of 88° to 60° relative to the peripheral rim, edge, or tire relative to the axis of rotation, but the edges may be formed at a larger angle, if desired, within the scope of the invention such as 35° to 40° or radial rake of 55° to 50°, and, as previously pointed out, may occupy up to around 270° of the peripheral surface of the rim or less as desired. The skiving or shearing cutting edges are formed on the selected portion of the rim periphery by removing material from rim periphery creating the grooves 32 and establishing the lands 33 which carry the cutting edges 31. The lands 33 may have a back-off or relief area 34 to provide clearance for the next adjacent cutting edge, the primary land having 12° to 20° clearance normal to the cutting edge which provides approximately 3° to 8° clearance in the plane of rotation, as is well understood by those versed in the art.

The rotary shear cutter disclosed in this application has an axis P—P' which is the axis of rotation of the cutter. The shear cutter has its arcuate peripheral edge struck from the axis O—O' which is the axis of the rim edge of the discular or wheel-like body of the cutter and which should not be confused with the axis of rotation of the cutter.

Quite obviously, the arcuate edge portion can be arcuate of a segment from 1° to 270° with the most useful range lying between 60° to 200° and which range is usually adapted to include the peripheral edge and one side face of the cuter edge as shown in the drawing.

The helical cutting edges are formed on the arcuate edge about the axis O—O' which is the axis of the rim edge. The helical cutting edges are formed on the angles hereinbefore specified and these angles are with respect to a plane normal to the axis of rotation of the cutter so that the operation of the cutter results in a sliding-shearing or shaving action which smoothly and accurately removes material from a workpiece.

In using the shear cutter disclosed herein, the rotating tool is brought into engagement with the workpiece, Figs. 8 and 9, which also may be revolving, if desired. The cutting edges of the tool remove material from the workpiece by a sliding-shearing action and it should be particularly noted that because of this sliding-shearing action the tool need be passed over the workpiece only once to obtain a smooth and accurate surface. The cutting edges of the tool being disposed on a small spiral angle relative to the axis of tool rotation, a given section of the cutting edge removes material from the workpiece in a direction upward and away from the workpiece, as viewed in Fig. 8. The next adjacent section of the cutting edge does not engage the workpiece until it has advanced to the extremity of the cut made by the first mentioned section. The significance of this manner of removing material from a workpiece is that the cutting edges are not required to cut through areas which have been hardened by machining. The result of this is longer life of the tool since it does not have to be sharpened as frequently as ordinary cutting tools.

The shear cutters disclosed herein combine the attributes of a side mill and an end mill resulting in increased efficiency of production of certain products. While the invention has been described in detail, including several modifications, it is obvious that the invention is susceptible of various modifications. This disclosure, therefore, is to be considered as illustrative of various preferred embodiments only, the invention itself being defined in the subjoined claims.

I claim:

1. A rotary cutting tool comprising a disc, a peripheral edge on said disc; said peripheral edge extending beyond the plane of at least one axial side of said disc; said peripheral edge of said disc being arcuate in cross section for at least 200 degrees of surface, said peripheral edge being provided with a plurality of spirally disposed teeth extending over at least 180 degrees of surface on said edge; each of said teeth being disposed on the same spiral angle which ranges from 2 to 30 degrees with respect to a plane lying normal to the axis of rotation of said disc thereby presenting smoothly contouring complete cutting edges on said edge relative to planes at angles to each other over 90 degrees.

2. A rotary tool having combined side-mill and end-mill characteristics, comprising a body having a peripheral segmental edge arcuate in cross section, said peripheral edge extending beyond the plane of at least one axial side of said body, said peripheral edge being provided with smoothly contouring complete cutting edges whereby said tool may be used to mill surfaces disposed at an angle to each other and in planes lying axially and circumferentially relative to said tool without the necessity of changing the plane of the tool's axis or rotation.

3. A rotary tool as set forth in claim 2 wherein the peripheral edge also extends beyond the plane of the other side of said body.

References Cited in the file of this patent

UNITED STATES PATENTS

| | | |
|---|---|---|
| 1,311,686 | Goddard | July 29, 1919 |
| 1,626,598 | Carlson | May 3, 1927 |
| 2,649,648 | Pinto | Aug. 25, 1953 |